United States Patent
Luan et al.

(10) Patent No.: US 12,229,890 B2
(45) Date of Patent: Feb. 18, 2025

(54) MODEL PREDICTION

(71) Applicant: Hewlett-Packard Development Company, L.P., Spring, TX (US)

(72) Inventors: He Luan, Palo Alto, CA (US); Juan Carlos Catana Salazar, San Diego, CA (US); Jun Zeng, Palo Alto, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 17/792,674

(22) PCT Filed: Jan. 31, 2020

(86) PCT No.: PCT/US2020/016074
§ 371 (c)(1),
(2) Date: Jul. 13, 2022

(87) PCT Pub. No.: WO2021/154276
PCT Pub. Date: Aug. 5, 2021

(65) Prior Publication Data
US 2023/0043252 A1 Feb. 9, 2023

(51) Int. Cl.
*G06T 17/10* (2006.01)
*G06T 7/149* (2017.01)

(52) U.S. Cl.
CPC ........... *G06T 17/10* (2013.01); *G06T 7/149* (2017.01); *G06T 2207/10028* (2013.01); *G06T 2207/20081* (2013.01)

(58) Field of Classification Search
CPC .............. G06T 17/10; G06T 7/149; G06T 2207/10028; G06T 2207/20081; G06F 2113/10; G06F 30/27; G06N 3/045; G06N 20/00; G06N 3/08; B22F 10/80; B33Y 50/00; B29C 64/386
See application file for complete search history.

(56) References Cited

U.S. PATENT DOCUMENTS

| 9,008,813 | B2 | 4/2015 | Xu et al. |
| 9,886,526 | B2 | 2/2018 | Huang |
| 10,078,711 | B2 | 9/2018 | Sakamoto |
| 10,345,437 | B1* | 7/2019 | Russell ............... G01S 17/06 |

(Continued)

FOREIGN PATENT DOCUMENTS

| CN | 109808183 A | 5/2019 |
| CN | 109919145 A * | 6/2019 |

(Continued)

OTHER PUBLICATIONS

CN-109919145-A (Machine Translation on Sep. 9, 2024) (Year: 2019).*

(Continued)

*Primary Examiner* — Michael Le
(74) *Attorney, Agent, or Firm* — Shook, Hardy & Bacon L.L.P.

(57) ABSTRACT

Examples of methods for model prediction are described herein. In some examples, a method includes predicting a compensated model. In some examples, the compensated model is predicted based on a three-dimensional (3D) object model. In some examples, a method includes predicting a deformed model. In some examples, the deformed mode is predicted based on the compensated model.

15 Claims, 8 Drawing Sheets

(56) References Cited

U.S. PATENT DOCUMENTS

| | | | |
|---|---|---|---|
| 10,474,134 B2 | 11/2019 | Huang et al. | |
| 2015/0055821 A1* | 2/2015 | Fotland | G06V 10/255 |
| | | | 382/103 |
| 2016/0088284 A1 | 3/2016 | Sareen et al. | |
| 2016/0243644 A1 | 8/2016 | Moneta et al. | |
| 2016/0320771 A1* | 11/2016 | Huang | B33Y 50/00 |
| 2017/0372801 A1 | 12/2017 | Wong | |
| 2018/0075643 A1 | 3/2018 | Sequeira et al. | |
| 2018/0095450 A1* | 4/2018 | Lappas | B33Y 10/00 |
| 2018/0293788 A1* | 10/2018 | Black | G06Q 30/0601 |
| 2018/0307209 A1 | 10/2018 | Chin et al. | |
| 2019/0080483 A1* | 3/2019 | Mammou | G06T 3/4007 |
| 2019/0099951 A1* | 4/2019 | Zhang | G06T 17/205 |
| 2019/0325572 A1* | 10/2019 | Mansi | A61B 5/103 |
| 2019/0346830 A1 | 11/2019 | De Souza Borges Ferreira et al. | |
| 2019/0371053 A1* | 12/2019 | Engholm | G06T 17/10 |
| 2019/0377843 A1* | 12/2019 | Chen | G06F 30/23 |
| 2020/0342684 A1* | 10/2020 | Kinsella | G06T 7/344 |

FOREIGN PATENT DOCUMENTS

| | | |
|---|---|---|
| CN | 110400283 A | 11/2019 |
| CN | 110555399 A | 12/2019 |
| CN | 110570512 A | 12/2019 |
| WO | 2018/217903 A1 | 11/2018 |
| WO | 2019/104397 A1 | 6/2019 |

OTHER PUBLICATIONS

Wang, Y. et al. "Dynamic Graph CNN for Learning on Point Clouds." ACM Trans. Graph, vol. 1, No. 1, Jan. 2019, 13 pages. (Year: 2019).*

Loriot, Sebastien, et al., CGAL 5.3—Polygon Mesh Processing: User Manual, Apr. 23, 2016, retrieved on Jul. 29, 2021, available at <https://doc.cgal.org/latest/Polygon_mesh_processing/index.html#/title8>, 30 pages.

Sabbaghi, Arman et al. "Inference for Deformation and Interference in 3d Printing", 2014, The Annals of Applied Statistics, vol. 8, No. 3, 22 pages.

Wang, Y. et al. "Dynamic Graph CNN for Learning on Point Clouds." ACM Trans. Graph, vol. 1, No. 1, Jan. 2019, 13 pages.

Chowdhury, S., et al., "Artificial Neural Network Based Geometric Compensation for Thermal Deformation in Additive Manufacturing Processes," 11th International Manufacturing Science and Engineering, vol. 3, Joint MSEC-NAMRC Symposia, Jun. 27, 2016, pp. 10.

Zhen, S., et al., "A Learning-Based Framework for Error Compensation in 3D Printing", IEEE Transactions on Cybernetics, vol. 49, No. 11, Nov. 1, 2019, pp. 4042-4050.

* cited by examiner

MODEL PREDICTION

BACKGROUND

Three-dimensional (3D) solid parts may be produced from a digital model using additive manufacturing. Additive manufacturing may be used in rapid prototyping, mold generation, mold master generation, and short-run manufacturing. Additive manufacturing involves the application of successive layers of build material. This is unlike some machining processes that often remove material to create the final part. In some additive manufacturing techniques, the build material may be cured or fused.

DETAILED DESCRIPTION

Additive manufacturing may be used to manufacture three-dimensional (3D) objects. 3D printing is an example of additive manufacturing. For example, thermal energy may be projected over material in a build area, where a phase change and solidification in the material may occur at certain voxels. A voxel is a representation of a location in a 3D space (e.g., a component of a 3D space). For instance, a voxel may represent a volume that is a subset of the 3D space. In some examples, voxels may be arranged on a 3D grid. For instance, a voxel may be cuboid or rectangular prismatic in shape. In some examples, voxels in the 3D space may be uniformly sized or non-uniformly sized. Examples of a voxel size dimension may include 25.4 millimeters (mm)/150≈170 microns for 150 dots per inch (dpi), 490 microns for 50 dpi, 2 mm, 4 mm, etc. The term "voxel level" and variations thereof may refer to a resolution, scale, or density corresponding to voxel size.

In some examples, the techniques described herein may be utilized for various examples of additive manufacturing. For instance, some examples may be utilized for plastics, polymers, semi-crystalline materials, metals, etc. Some additive manufacturing techniques may be powder-based and driven by powder fusion. Some examples of the approaches described herein may be applied to area-based powder bed fusion-based additive manufacturing, such as Stereolithography (SLA), Multi-Jet Fusion (MJF), Metal Jet Fusion, metal binding printing, Selective Laser Melting (SLM), Selective Laser Sintering (SLS), liquid resin-based printing, etc. Some examples of the approaches described herein may be applied to additive manufacturing where agents carried by droplets are utilized for voxel-level thermal modulation.

In some examples of additive manufacturing, thermal energy may be utilized to fuse material (e.g., particles, powder, etc.) to form an object. For example, agents (e.g., fusing agent, detailing agent, etc.) may be selectively deposited to control voxel-level energy deposition, which may trigger a phase change and/or solidification for selected voxels. The manufactured object geometry may be driven by the fusion process, which enables predicting or inferencing the geometry following manufacturing. Some first principle-based manufacturing simulation approaches are relatively slow, complicated, and/or may not provide target resolution (e.g., sub-millimeter resolution). Some machine learning approaches (e.g., some deep learning approaches) may offer improved resolution and/or speed. As used herein, the term "predict" and variations thereof may refer to determining and/or inferencing. For instance, an event or state may be "predicted" before, during, and/or after the event or state has occurred.

A machine learning model is a structure that learns based on training. Examples of machine learning models may include artificial neural networks (e.g., deep neural networks, convolutional neural networks (CNNs), dynamic graph CNNs (DGCNNs), etc.). Training the machine learning model may include adjusting a weight or weights of the machine learning model. For example, a neural network may include a set of nodes, layers, and/or connections between nodes. The nodes, layers, and/or connections may have associated weights. The weights may be adjusted to train the neural network to perform a function, such as predicting object geometry after manufacturing, object deformation, or compensation. Examples of the weights may be in a relatively large range of numbers and may be negative or positive.

An object model is data that represents an object. For example, an object model may include geometry (e.g., points, vertices, lines, polygons, etc.) that represents an object.

Some examples of the techniques described herein may utilize a machine learning model (e.g., deep neural network) to predict or infer a deformed model. A deformed model is an object model that indicates object deformation (e.g., deformation from manufacturing). For example, a machine learning model may provide a quantitative model for directly predicting object deformation. Object deformation is a change or disparity in object geometry from a 3D object model. A 3D object model is a 3D geometrical model of an object. Examples of 3D object models include computer-aided design (CAD) models, mesh models, 3D surfaces, etc. In some examples, a 3D object model may be utilized to manufacture (e.g., print) an object. In some examples, an apparatus may receive a 3D object model from another device (e.g., linked device, networked device, removable storage, etc.) or may generate the 3D object model. Object deformation may occur during manufacturing due to thermal diffusion, thermal change, gravity, manufacturing errors, etc. In some examples, the deformed model may be expressed as a point cloud, mesh model, 3D object model (e.g., CAD model), etc. In some examples, a machine learning model may predict the deformed model based on a 3D object model (e.g., a compensated model).

Some examples of the techniques described herein may utilize a machine learning model (e.g., a deep neural network) to predict or infer a compensated model. A compensated model is an object model that is compensated for potential or anticipated deformation (e.g., deformation from manufacturing). For example, a machine learning model may provide a quantitative model for directly predicting object compensation (e.g., a compensated object model or object model point cloud). The compensated model may be expressed as a point cloud, mesh model, 3D object model (e.g., computer-aided design (CAD) model), etc. In some examples, a machine learning model may predict or infer the compensated model. For instance, a machine learning model may predict the compensated model based on target geometry (e.g., a 3D object model). In some examples, manufacturing (e.g., printing) an object according to the compensated model may reduce error or geometric inaccuracy in the manufactured object, which may beneficially provide more accurate manufacturing.

In some examples of the techniques described herein, point clouds may be utilized to represent 3D objects and/or 3D object geometry. A point cloud is a set of points or locations in a 3D space. A point cloud may be utilized to represent a 3D object or 3D object model. For example, a 3D object may be scanned with a 3D scanner (e.g., depth sensor(s), camera(s), light detection and ranging (LIDAR) sensors, etc.) to produce a scanned object point cloud representing the 3D object (e.g., manufactured object, 3D printed object, etc.). The scanned object point cloud may include a set of points representing locations on the surface of the 3D object in 3D space. In some examples, an object model point cloud may be generated from a 3D object model (e.g., CAD model). For example, a random selection of the points from a 3D object model may be performed. For instance, an object model point cloud may be generated from a uniform random sampling of points from a surface of a 3D object model in some approaches. In some examples, an object model point cloud may be generated by uniformly projecting points over the surface of a 3D object model mesh. For example, a uniform density of points over the whole surface or a constant number of points per triangle in the mesh may be generated in some approaches. A uniform projection may refer to selecting points (e.g., point pairs) within a threshold distance from each other. A point cloud may be an irregular structure, where points may not necessarily correspond to a uniform grid.

Point clouds may provide a flexible geometric representation. However, applying deep learning to point cloud data may not be straightforward. For example, some deep neural network models may utilize input data with regular structure, while point clouds may have irregular structure. In some approaches, point clouds may be converted to a 3D volumetric representation for use with neural network models. However, converting the point clouds to a 3D volumetric representation may produce quantization artifacts and highly sparse data, which may fail to capture fine-gained features. Accordingly, approaches that can represent and learn local geometrical structures from unstructured point clouds may be beneficial.

In some examples of the techniques described herein, a machine learning model may be utilized to predict or infer a compensated point cloud. A compensated point cloud is a point cloud that is compensated for potential or anticipated deformation (e.g., deformation from manufacturing). A compensated point cloud may be an example of the compensated model described herein. For instance, the compensated point cloud may represent a 3D object model that is compensated for deformation from manufacturing. The machine learning model may predict or infer the compensated point cloud of the object based on an object model point cloud of a 3D object model (e.g., CAD model). In some examples, each point of the object model point cloud may be utilized and/or compensation prediction may be performed for all points of the object model point cloud.

In some examples of the techniques described herein, a machine learning model may be utilized to predict a deformed point cloud representing a manufactured object (before the object is manufactured and/or independent of object manufacturing, for instance). In some examples, the machine learning model may predict the deformed point cloud of the object (e.g., object deformation) based on an object model point cloud and/or a compensated point cloud. In some examples, each point of the object model point cloud may be utilized and/or deformation prediction may be performed for all points of the object model point cloud.

In some examples, a machine learning model or machine learning models may be trained using a point cloud or point clouds. For example, machine learning models may be trained using object model point clouds and scanned object point clouds. For instance, a 3D object model or models may be utilized to manufacture (e.g., print) a 3D object or objects. An object model point cloud or clouds may be determined from the 3D object model(s). A scanned object point cloud or point clouds may be obtained by scanning the manufactured 3D object or objects. In some examples, training data for training the machine learning models may include the scanned point clouds after alignment to the object model point clouds. For instance, a compensation machine learning model may be trained with the scanned point clouds as input and the object model point clouds as output. A compensation machine learning model is a machine learning model for predicting or inferencing a compensated model or compensated point cloud. In some examples, a deformation machine learning model may be trained with the object model point clouds as input and the scanned point clouds as output. A deformation machine learning model is a machine learning model for predicting or inferencing a deformed model or deformed point cloud.

Throughout the drawings, identical or similar reference numbers may designate similar, but not necessarily identical, elements. The figures are not necessarily to scale, and the size of some parts may be exaggerated to more clearly illustrate the example shown. Moreover, the drawings provide examples and/or implementations in accordance with the description; however, the description is not limited to the examples and/or implementations provided in the drawings.

Figure 1:
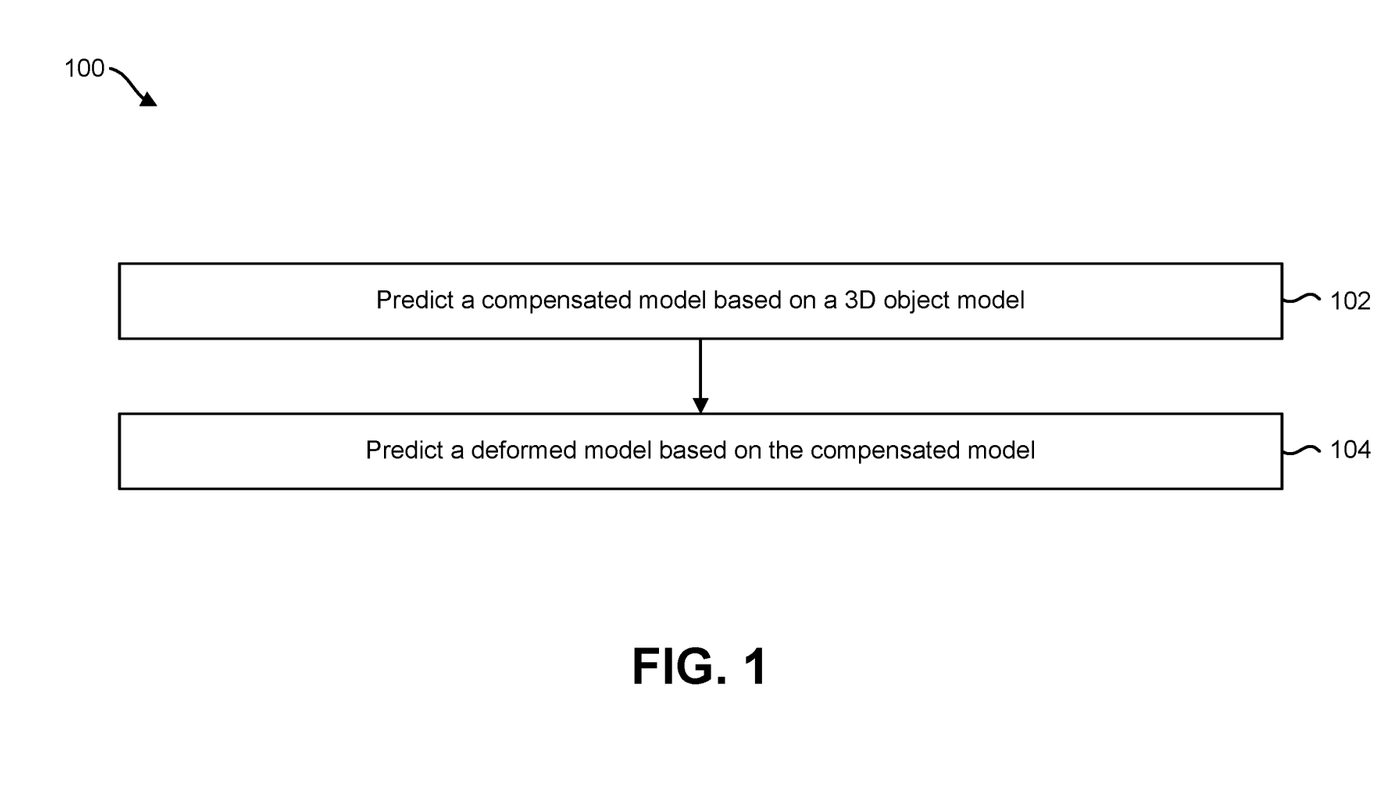
FIG. 1 is a flow diagram illustrating an example of a method for model prediction.

FIG. 1 is a flow diagram illustrating an example of a method 100 for model prediction. The method 100 and/or an element or elements of the method 100 may be performed by an apparatus (e.g., electronic device). For example, the method 100 may be performed by the apparatus 302 described in connection with FIG. 3.

The apparatus may predict 102 a compensated model based on a 3D object model. For example, the compensated model may be predicted 102 based on a compensation machine learning model. For instance, the apparatus may utilize a compensation machine learning model to predict 102 the compensated model. In some examples, the compensation machine learning model may be trained with a training scanned object point cloud or clouds as input and a training object model point cloud or clouds as output (e.g., ground truth). A training scanned object point cloud is a scanned object point cloud used for training. For example, training scanned object point clouds may be utilized to train a machine learning model before inferencing. A training object model point cloud is an object model point cloud used for training. For example, training object model point clouds may be utilized to train a machine learning model before prediction or inferencing.

In some examples, the compensated model may be predicted 102 based on an object model point cloud of the 3D object model. For instance, the 3D object model may be sampled to produce the object model point cloud. The object model point cloud may be input to the compensation machine learning model to predict or infer the compensated model (e.g., compensated point cloud).

The apparatus may predict 104 a deformed model based on the compensated model. For example, the deformed model may be predicted 104 based on a deformation machine learning model. For instance, the apparatus may utilize a deformation machine learning model to predict 104 the deformed model. In some examples, the deformation machine learning model may be trained with a training object model point cloud or clouds as input and a training scanned object point cloud or clouds as output (e.g., ground truth). In some examples, training scanned object point clouds may be utilized to train the deformation machine learning model before inferencing. In some examples, training object model point clouds may be utilized to train the deformation machine learning model before prediction or inferencing. The training scanned object point cloud(s) and/or the training object model point cloud(s) may be the same as or different from the training scanned object point cloud(s) and/or the training object model point cloud(s) utilized to train the compensation machine learning model. The input(s) and output(s) for training the compensation machine learning model may be reversed from the input(s) and output(s) for training the deformation machine learning model.

In some examples, the apparatus may compare the deformed model predicted from the compensated model with the 3D object model. Comparing the deformed model with the 3D object model may include determining a metric or metrics that indicate a comparison and/or may include determining an illustration or illustrations (e.g., plot(s), image(s), etc.) that indicate a comparison. Some examples of comparison metrics may include Euclidean distance(s) between the deformed model and the 3D object model, average (e.g., mean, median, and/or mode) distance between the deformed model and the 3D object model, a variance between the deformed model and the 3D object model, a standard deviation between the deformed model and the 3D object model, a difference or differences between the deformed model and the 3D object model, average difference between the deformed model and the 3D object model, mean-squared error between the deformed model and the 3D object model, a plot that illustrates the deformed model with the 3D object model, a plot that illustrates a degree of error or difference over the surface of the 3D object model (or deformed model), etc.

In some examples, the apparatus may provide the deformed model (e.g., deformed model point cloud) and/or comparison. For instance, the apparatus may store the deformed model and/or comparison, may send the deformed model and/or comparison to another device, and/or may present the deformed model and/or comparison (on a display and/or in a user interface, for example).

In some examples, the deformed model and/or comparison may provide information on how an object (e.g., manufactured object) may be deformed. In some examples, an accurate deformation machine learning model may be beneficial in determining a compensation machine learning model. For example, a compensation machine learning model may utilize a similar architecture as a deformation machine learning model. In some examples, the compensation machine learning model may be trained with an input and output reversed relative to the deformation machine learning model. In some examples, the compensation machine learning model may be utilized to manufacture (e.g., 3D print) an object. Accordingly, a compensation machine learning model with improved performance (e.g., accuracy) may result in a manufactured object with more accurate geometry.

In some examples, the apparatus may utilize the deformed model and/or comparison to compensate for the predicted deformations. For instance, the apparatus may adjust the 3D object model (e.g., CAD model), the compensated model, the compensation machine learning model, and/or printing variables (e.g., amount of agent, thermal exposure time, etc.) to reduce or avoid error or geometric inaccuracy in the manufactured object. In some approaches, the apparatus may perform iterative compensation. For instance, the apparatus may predict object deformation using a 3D object model (e.g., the placement of a fusing voxel or voxels), may adjust the 3D object model, the compensated model (e.g., compensated geometry), the compensation machine learning model (e.g., weight(s)), and/or printing variables, and may repeat predicting object deformation using the adjustment(s). Adjustments that reduce predicted object deformation may be retained and/or amplified. Adjustments that increase predicted object deformation may be reversed and/or reduced. This procedure may iterate until the predicted deformation is reduced to a target amount. In some examples, a 3D printer may print the adjusted (e.g., deformation-reduced and/or improved) 3D model and/or compensated model.

Figure 2:
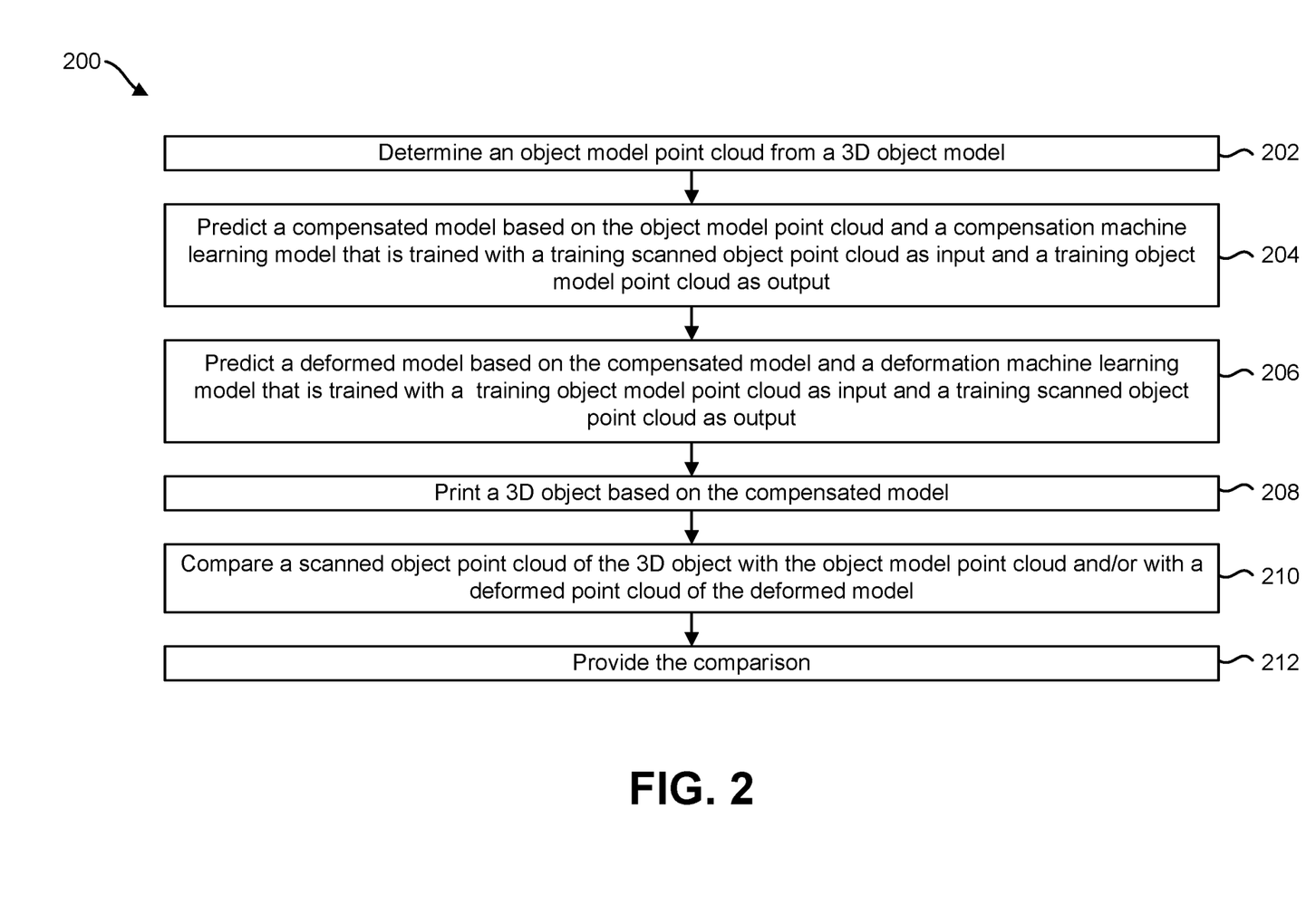
FIG. 2 is a flow diagram illustrating another example of a method for model prediction.

FIG. 2 is a flow diagram illustrating another example of a method 200 for model prediction. The method 200 and/or an element or elements of the method 200 may be performed by an apparatus (e.g., electronic device). For example, the method 200 may be performed by the apparatus 302 described in connection with FIG. 3.

The apparatus may determine 202 an object model point cloud from a 3D object model. In some examples, determining 202 the object model point cloud may be performed as described above. For instance, the apparatus may uniformly randomly sample surface points from the 3D object model in some approaches.

The apparatus may predict 204 a compensated model based on the object model point cloud and a compensation machine learning model. The compensation machine learning model may be trained with a training scanned object point cloud or clouds as input and a training object model point cloud or clouds as output (e.g., ground truth). In some examples, predicting 204 the compensated model may be performed as described in relation to FIG. 1. In some examples, the compensated model may be a compensated point cloud.

The apparatus may predict 206 a deformed model based on the compensated model (e.g., compensated model point cloud) and a deformation machine learning model. The deformation machine learning model may be trained with a training object model point cloud or clouds as input and a training scanned object point cloud or clouds as output (e.g., ground truth). In some examples, predicting 206 the deformed model may be performed as described in relation to FIG. 1. In some examples, the deformed model may be a deformed point cloud.

In some examples, predicting 206 the deformed model is performed in an offline stage. An offline stage is a procedure, mode, and/or period that is independent of manufacturing. For example, the deformed model may be predicted 206 independent of whether the object is manufactured (e.g., printed). For instance, the deformed model may be predicted 206 separately from manufacturing (e.g., printing) the object.

The apparatus may print 208 a 3D object based on the compensated model. For example, the apparatus may instruct and/or control a printing device or devices (e.g., printhead(s), thermal projector(s), roller(s), build volume(s), agent dispenser(s), 3D printer(s), etc.) to print 208 the 3D object indicated by the compensated model. In some examples, the apparatus may print 208 the 3D object by sending instructions (e.g., instructions indicating the compensated model) to a printer.

In some examples, printing 208 the 3D object is performed in an online stage. An online stage is a procedure, mode, and/or period where an object is manufactured. For example, an object may be manufactured (e.g., printed) in the online stage. In some examples, the 3D object may be printed independently from and/or separately from predicting 206 the deformed model.

The apparatus may compare 210 a scanned object point cloud of the 3D object with the object model point cloud and/or with a deformed point cloud of the deformed model. For example, the apparatus may compare the scanned object point cloud with the object model point cloud, may compare the scanned object point cloud with the deformed point cloud, and/or may compare the deformed point cloud with the object model point cloud.

In some examples, the apparatus may scan the object (e.g., manufactured object) to determine the scanned object point cloud and/or may receive a scan or the scanned object point cloud from another device (e.g., scanner). For example, the apparatus may include and/or may be linked to a scanning device. The scanning device may be utilized to scan the object as described above in some examples. In some examples, the apparatus may determine the scanned object point cloud based on a scan. For example, the apparatus may perform a random selection of points from the scan. For instance, scanned object point cloud may be generated from a uniform random sampling of points from a surface of the scan in some approaches. In some examples, a scanned object point cloud may be generated by uniformly projecting points over the surface of a scan mesh. For example, a uniform density of points over the whole surface or a constant number of points per triangle in the mesh may be generated in some approaches.

In some examples, the apparatus may compare a pair or pairs of point clouds (e.g., scanned object point cloud, deformed point cloud, and object model point cloud). For instance, comparing point clouds may include determining a metric or metrics that indicate a comparison and/or may include determining an illustration or illustrations (e.g., plot(s), image(s), etc.) that indicate a comparison. Some examples of comparison metrics may include Euclidean distance(s) between point clouds, average (e.g., mean, median, and/or mode) distance between point clouds, a variance between point clouds, a standard deviation between point clouds, a difference or differences between point clouds, average difference between point clouds, mean-squared error between point clouds, a plot that illustrates a comparison of the deformed point cloud, the scanned object point cloud, and/or the object model point cloud, a plot that illustrates a degree of error or difference over the surface of the deformed point cloud, the scanned object point cloud, and/or the object model point cloud. In some examples, the apparatus may compare the compensated model (e.g., compensated point cloud) with the deformed point cloud, the scanned object point cloud, and/or the object model point cloud.

The apparatus may provide 212 comparison. For instance, the apparatus may store the comparison, may send the comparison to another device, and/or may present the comparison (on a display and/or in a user interface, for example). In some examples, the apparatus may provide the object model point cloud, the scanned object point cloud, the deformed point cloud, and/or the compensated point cloud. For example, the apparatus may present an image of the scanned object point cloud with the object model point cloud and/or with the deformed point cloud. In some examples, operation(s), function(s), and/or element(s) of the method 200 may be omitted and/or combined.

From a physical domain perspective, some additive manufacturing techniques (e.g., MJF) are fusion processes, where the thermal diffusion may dominate the end-part deformation. With edge convolution, convolution may be enabled on point clouds. In some examples, a machine learning model (e.g., DGCNN) may include a stack of edge convolution blocks and/or layers. For instance, the machine learning model may include edge convolution layers. The machine learning model may extract the geometrically deformed features and/or may provide accurate object geometry prediction.

Figure 3:
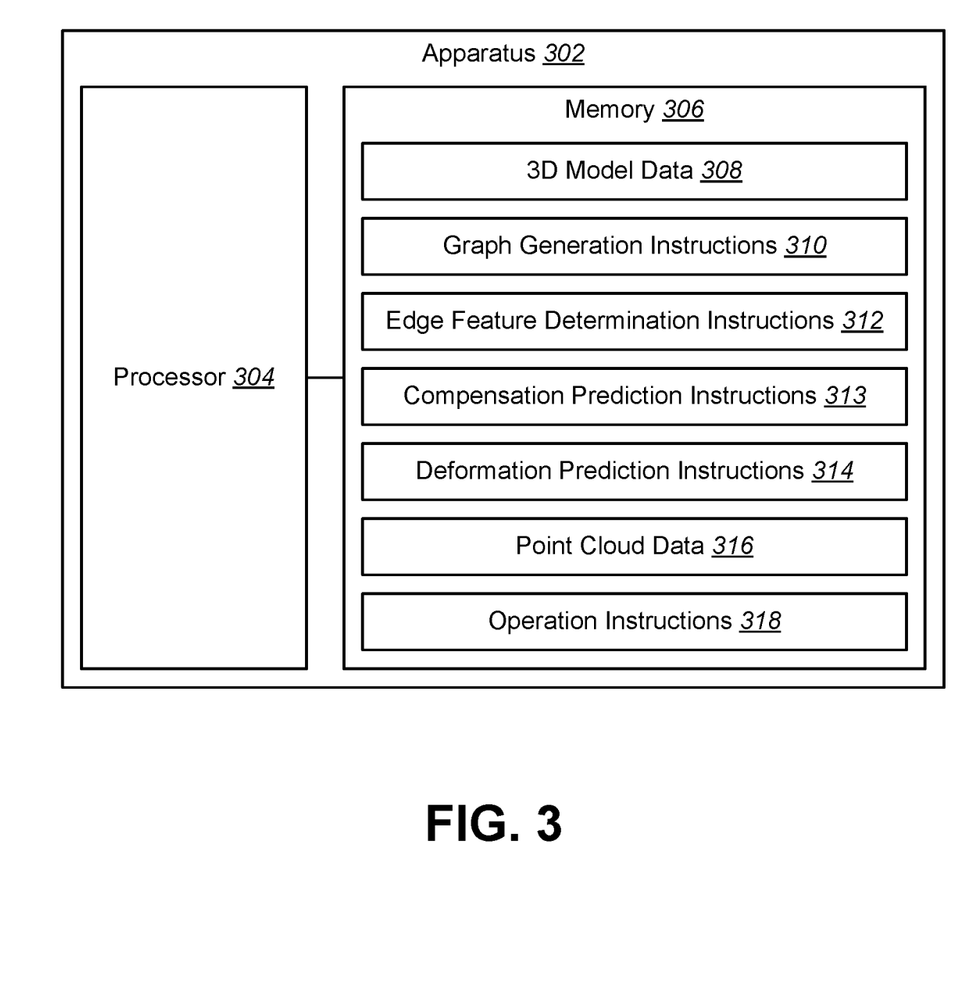
FIG. 3 is a block diagram of an example of an apparatus that may be used in model prediction.

FIG. 3 is a block diagram of an example of an apparatus 302 that may be used in model prediction. The apparatus 302 may be a computing device, such as a personal computer, a server computer, a printer, a 3D printer, a smartphone, a tablet computer, etc. The apparatus 302 may include and/or may be coupled to a processor 304, and/or to a memory 306. The processor 304 may be in electronic communication with the memory 306. In some examples, the apparatus 302 may be in communication with (e.g., coupled to, have a communication link with) an additive manufacturing device (e.g., a 3D printing device) and/or a scanning device. In some examples, the apparatus 302 may be an example of a 3D printing device. The apparatus 302 may include additional components (not shown) and/or some of the components described herein may be removed and/or modified without departing from the scope of this disclosure.

The processor 304 may be any of a central processing unit (CPU), a semiconductor-based microprocessor, graphics processing unit (GPU), field-programmable gate array (FPGA), an application-specific integrated circuit (ASIC), and/or other hardware device suitable for retrieval and execution of instructions stored in the memory 306. The processor 304 may fetch, decode, and/or execute instructions (e.g., graph generation instructions 310, edge feature determination instructions 312, compensation prediction instructions 313, deformation prediction instructions 314, and/or operation instructions 318) stored in the memory 306. In some examples, the processor 304 may include an electronic circuit or circuits that include electronic components for performing a functionality or functionalities of the instructions (e.g., graph generation instructions 310, edge feature determination instructions 312, compensation prediction instructions 313, deformation prediction instructions 314, and/or operation instructions 318). In some examples, the processor 304 may perform one, some, or all of the functions, operations, elements, methods, etc., described in connection with one, some, or all of FIGS. 1-8B.

The memory 306 may be any electronic, magnetic, optical, or other physical storage device that contains or stores electronic information (e.g., instructions and/or data). Thus, the memory 306 may be, for example, Random Access Memory (RAM), Electrically Erasable Programmable Read-Only Memory (EEPROM), a storage device, an optical disc, and the like. In some implementations, the memory 306 may be a non-transitory tangible machine-readable storage medium, where the term "non-transitory" does not encompass transitory propagating signals.

In some examples, the apparatus 302 may also include a data store (not shown) on which the processor 304 may store information. The data store may be volatile and/or non-volatile memory, such as Dynamic Random-Access Memory (DRAM), EEPROM, magnetoresistive random-access memory (MRAM), phase change RAM (PCRAM), memristor, flash memory, and the like. In some examples, the memory 306 may be included in the data store. In some examples, the memory 306 may be separate from the data store. In some approaches, the data store may store similar instructions and/or data as that stored by the memory 306. For example, the data store may be non-volatile memory and the memory 306 may be volatile memory.

In some examples, the apparatus 302 may include an input/output interface (not shown) through which the processor 304 may communicate with an external device or devices (not shown), for instance, to receive and/or store information pertaining to an object or objects for which compensation and/or deformation may be predicted. The input/output interface may include hardware and/or machine-readable instructions to enable the processor 304 to communicate with the external device or devices. The input/output interface may enable a wired or wireless connection to the external device or devices. In some examples, the input/output interface may further include a network interface card and/or may also include hardware and/or machine-readable instructions to enable the processor 304 to communicate with various input and/or output devices, such as a keyboard, a mouse, a display, another apparatus, electronic device, computing device, etc., through which a user may input instructions into the apparatus 302. In some examples, the apparatus 302 may receive 3D model data 308 and/or point cloud data 316 from an external device or devices (e.g., 3D scanner, removable storage, network device, etc.).

In some examples, the memory 306 may store 3D model data 308. The 3D model data 308 may be generated by the apparatus 302 and/or received from another device. Some examples of 3D model data 308 include a 3D manufacturing format (3MF) file or files, a 3D computer-aided design (CAD) image, object shape data, mesh data, geometry data, etc. The 3D model data 308 may indicate the shape of an object or objects.

In some examples, the memory 306 may store point cloud data 316. The point cloud data 316 may be generated by the apparatus 302 and/or received from another device. Some examples of point cloud data 316 include an object model point cloud or point clouds generated from the 3D model data 308, a scanned object point cloud or point clouds from a scanned object or objects, a compensated point cloud or point clouds, and/or a deformed point cloud or point clouds. For example, the processor 304 may determine an object model point cloud from a 3D object model indicated by the 3D model data 308. The object model point cloud may be stored with the point cloud data 316. In some examples, the apparatus may receive a 3D scan or scans of an object or objects from another device (e.g., linked device, networked device, removable storage, etc.) or may capture the 3D scan that may indicate a scanned object point cloud.

The memory 306 may store compensation prediction instructions 313. The processor 304 may execute the compensation prediction instructions 313 to predict a compensated point cloud based on an object model point cloud. In some examples, the compensation prediction instructions 313 may include a compensation machine learning model. For example, the processor 304 may use a compensation machine learning model to predict a compensated point cloud based on an object model point cloud.

The memory 306 may store graph generation instructions 310. The processor 304 may execute the graph generation instructions 310 to generate a graph or graphs. For instance, the processor 304 may execute the graph generation instructions 310 to generate a graph by determining edges for each point of the object model point cloud. In some examples, the processor 304 may determine the object model point cloud from the 3D model data 308. In some examples, the graph may include points of the object model point cloud as vertices and the determined edges. In some examples, the apparatus 302 may generate a graph for the object model point cloud(s), a compensated point cloud(s), a deformed point cloud(s), and/or a scanned point cloud(s). For example, generating a graph may be performed for a training point cloud(s) and/or for point cloud(s) for prediction or inferencing.

In some examples, the apparatus 302 (e.g., processor 304) may determine edges from an object model point cloud. An edge is a line or association between points. In some examples, the apparatus 302 may determine edges from the object model point cloud by determining neighbor points for each point of the object model point cloud. A neighbor point is a point that meets a criterion relative to another point. For example, a point or points that are nearest to another point (in terms of Euclidean distance, for example) may be a neighbor point or neighbor points relative to the other point. In some examples, the edges may be determined as lines or associations between a point and corresponding neighbor points.

In some examples, the apparatus 302 (e.g., processor 304) may determine the nearest neighbors using a K nearest neighbors (KNN) approach. For example, K may be a value that indicates a threshold number of neighbor points. For instance, the apparatus may determine the K points that are nearest to another point as the K nearest neighbors.

In some examples, the apparatus 302 (e.g., processor 304) may generate edges between a point and the corresponding neighbor points. For instance, the apparatus may store a record of each edge between a point and the corresponding neighbor points. In some approaches, a point (of a point cloud, for instance) may be denoted $x_i=(x_i, y_i, z_i)$, where $x_i$ is a location of the point in an x dimension or width dimension, $y_i$ is a location of the point in a y dimension or depth dimension, $z_i$ is a location of the point in a z dimension or height dimension, and i is an index for a point cloud. For instance, for each point $x_i$, the apparatus 302 (e.g., processor 304) may find neighbor points (e.g., KNN). The apparatus 302 (e.g., processor 304) may generate edges between each point and corresponding neighbor points. In some examples, determining the edges may generate a graph G=(V, E), where V are the points (or vertices) and E are the edges of the graph G. A graph is a data structure including a vertex or vertices and/or an edge or edges. An edge may connect two vertices. In some examples, a graph may or may not be a visual display or plot of data. For example, a plot or visualization of a graph may be utilized to illustrate and/or present a graph.

In some examples, determining the edges may be based on distance metrics. For instance, the apparatus 302 (e.g., processor 304) may determine a distance metric between a point and a candidate point. A candidate point is a point in the point cloud that may potentially be selected as a neighbor point. In some examples, the neighbor points (e.g., KNN) may be determined in accordance with a Euclidean distance as provided in Equation (1).

$$d(x_i,x_j)^2+(y_i,y_h)^2+(z_i,z_j)^2 \quad (1)$$

In Equation (1), j is an index for points where j≠i. The K candidate points that are nearest to the point may be selected as the neighbor points and/or edges may be generated between the point and the K nearest candidate points. K may be predetermined or determined based on a user input.

In some examples, the apparatus 302 (e.g., processor 304) may determine a local value for each of the edges. A local value is a value (or vector of values) that indicates local neighborhood information to simulate a thermal diffusion effect. In some examples, the local value may be determined as $(x_j-x_i)$. For instance, the local value may be a difference between the point and a neighbor point. In some examples, the local value may be weighted with a local weight $\theta_m$ (e.g., $\theta_m \cdot (x_j-x_i)$). In some examples, the local weight may be estimated during machine learning model training for learning local features and/or representations. For instance, $\theta_m \cdot (x_j-x_i)$ may capture local neighborhood information, with a physical insight to simulate more detailed thermal diffusive effects. Examples of the local weight may be in a relatively large range of numbers and may be negative or positive.

In some examples, the apparatus 302 (e.g., processor 304) may determine a combination of the local value and a global value for each of the edges. A global value is a value that indicates global information to simulate a global thermal mass effect. For instance, the global value may be the point $x_i$. In some examples, the global value may be weighted with a global weight $\phi_m$ (e.g., $\phi_m \cdot x_i$). In some examples, the global weight may be estimated during machine learning model training for learning a global deformation effect on each point. For instance, $\phi_m \cdot x_i$ may explicitly adopt global shape structure, with a physical insight to simulate the overall thermal mass. In some examples, determining the combination of the local value and the global value for each of the edges may include summing the local value and the global value (with or without weights) for each of the edges. For instance, the apparatus 302 (e.g., processor 304) may calculate $\theta_m \cdot (x_j-x_i)+\phi_m \cdot x_i$. Examples of the global weight may be in a relatively large range of numbers and may be negative or positive.

In some examples, the memory 306 may store edge feature determination instructions 312. In some examples, the processor 304 may execute the edge feature determination instructions 312 to determine an edge feature for each of the edges of the graph. For example, the apparatus 302 (e.g., processor) may determine an edge feature for each of the edges determined from a point cloud (e.g., object model point cloud, compensated point cloud, etc.). An edge feature is a value (or vector of values) that indicates a relationship between points (e.g., neighbor points). In some examples, an edge feature may represent a geometrical structure associated with an edge connecting two points (e.g., neighbor points). In some examples, the processor 304 may determine a local value for each of the edges, may determine a combination of the local value and a global value for each of the edges, and/or may apply an activation function to each of the combinations to determine the edge feature.

In some examples, the apparatus 302 (e.g., processor 304) may determine an edge feature based on the combination for each of the edges. In some examples, the apparatus 302 (e.g., processor 304) may determine the edge feature by applying an activation function to the combination for each of the edges. For instance, the apparatus 302 (e.g., processor 304) may determine the edge feature in accordance with Equation (2).

$$e_{ijm}=\mathrm{ReLU}(\theta_m(x_j-x_i)+\phi_m \times x_i) \quad (2)$$

In Equation (2), $e_{ijm}$ is the edge feature, m is a channel index for a machine learning model (e.g., convolutional neural network, compensation machine learning model, and/or deformation machine learning model), and ReLU is a rectified linear unit activation function. For instance, the rectified linear unit activation function may take a maximum of 0 and the input value. Accordingly, the rectified linear unit activation function may output zeros for negative input values and may output values equal to positive input values.

In some examples, the apparatus 302 (e.g., processor 304) may convolve the edge features to predict a point cloud. For example, the apparatus 302 may convolve edge features to predict a compensated point cloud or a deformed point cloud. In some examples, the apparatus 302 (e.g., processor 304) may convolve the edge features by summing edge features. For instance, the apparatus 302 (e.g., processor 304) may convolve the edge features in accordance with Equation (3).

$$x_{im}'=\Sigma_j:(i,j\in E)^{e_{ijm}} \quad (3)$$

In Equation (3), $x_{im}'$ is a point of the predicted point cloud (e.g., an i-th vertex). As illustrated by Equation (3), convolution on the graph (e.g., KNN graph) is transferred to a regular convolution. Accordingly, some of the techniques described herein enable a machine learning model (e.g., convolutional neural network) to predict object compensation (e.g., point-cloud-wise object compensation) and/or object deformation (e.g., point-cloud-wise object deformation) using a point cloud or point clouds (e.g., object model point cloud, compensated point cloud).

In some examples, the processor 304 may execute the compensation prediction instructions 313, the graph generation instructions 310, and/or the edge feature determination instructions 312 to predict the compensated point cloud. For example, the apparatus 302 (e.g., processor 304) may utilize the compensation machine learning model, the graph generation instructions 310, and/or the edge feature determination instructions 312 to generate a compensated point cloud based on the object model point cloud. For instance, the apparatus 302 (e.g., processor 304) may generate a graph from the object model point cloud, may determine edge features from the graph, and/or may convolve the edge features to predict the compensated point cloud.

The memory 306 may store deformation prediction instructions 314. In some examples, the processor 304 may execute the deformation prediction instructions to predict a deformed point cloud. In some examples, the deformation prediction instructions 314 may include a deformation machine learning model. For instance, the apparatus 302 (e.g., processor 304) may use a deformation machine learning model to predict a deformed point cloud based on the compensated point cloud. In some examples, the apparatus 302 may generate a graph for the compensated point cloud, and/or may determine edge features for the compensated point cloud as described above. For instance, the processor 304 may execute the graph generation instructions 310 and/or the edge feature determination instructions 312 for the compensated point cloud. In some examples, the processor 304 may execute the deformation prediction instructions 314 to predict, based on the edge features (from the compensated point cloud, for instance), a deformed point cloud. In some cases, the deformation prediction may be performed before, during, or after (e.g., independently from) 3D printing of the object. In some examples, the processor 304 may predict the object deformation using a deformation machine learning model that comprises layers to convolve the edge features.

In some examples, the processor 304 may execute the operation instructions 318 to perform an operation. For example, the apparatus 302 may perform an operation based on the compensated point cloud and/or the deformed point cloud. For instance, the processor 304 may present the compensated point cloud and/or the deformed point cloud on a display, may store the compensated point cloud and/or the deformed point cloud in the memory 306, and/or may send the compensated point cloud and/or the deformed point cloud to another device or devices. In some examples, the apparatus 302 (e.g., processor 304) may compare point clouds. For example, the apparatus 302 may compare the deformed point cloud with the object model point cloud. In some examples, the apparatus 302 may perform a comparison as described in relation to FIG. 1 and/or FIG. 2. For example, the apparatus 302 may provide and/or present the comparison(s) as described in relation to FIG. 1 and/or FIG. 2.

In some examples, the apparatus 302 (e.g., processor 304) may manufacture (e.g., print) an object. For example, the apparatus 302 may print an object based on the compensated point cloud as described in relation to FIG. 1 and/or FIG. 2. For instance, the processor 304 may drive model setting based on a deformation-compensated 3D model that is based on the compensated point cloud and/or the deformed point cloud. In some examples, the object or objects may be scanned to produce a scanned object point cloud or clouds.

In some examples, the processor 304 may train a machine learning model or models. For example, the processor 304 may train the compensation machine learning model and/or the deformation machine learning model using point cloud data 316.

Some machine learning approaches may utilize training data to predict or infer object compensation and/or object deformation. The training data may indicate deformation that has occurred during a manufacturing process. For example, object deformation may be assessed based on a 3D object model (e.g., computer aided drafting (CAD) model) and a 3D scan of an object that has been manufactured based on the 3D object model. The object deformation assessment (e.g., the 3D object model and the 3D scan) may be utilized as a ground truth for machine learning. For instance, the object deformation assessment may enable deformation prediction and/or compensation prediction. In order to assess object deformation, the 3D object model and the 3D scan may be registered. Registration is a procedure to align objects.

Figure 4:
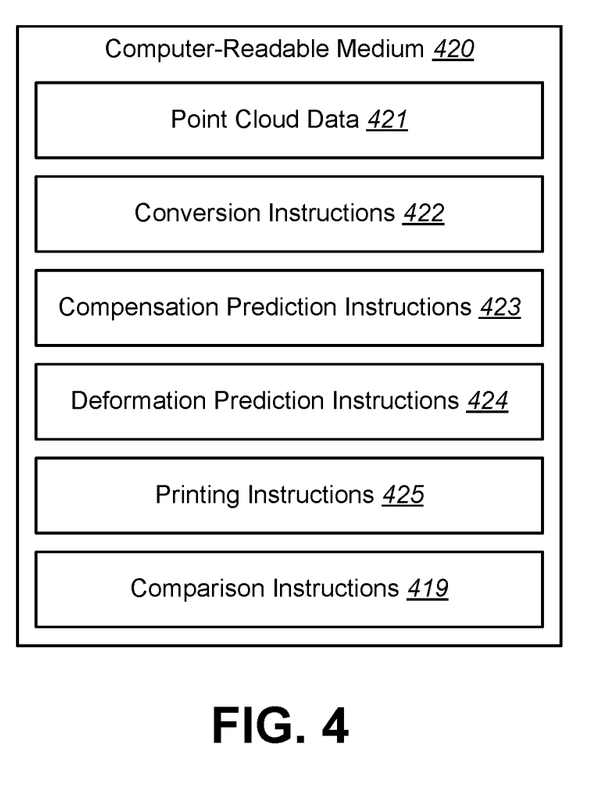
FIG. 4 is a block diagram illustrating an example of a computer-readable medium for model prediction.

FIG. 4 is a block diagram illustrating an example of a computer-readable medium 420 for model prediction. The computer-readable medium 420 may be a non-transitory, tangible computer-readable medium 420. The computer-readable medium 420 may be, for example, RAM, EEPROM, a storage device, an optical disc, and the like. In some examples, the computer-readable medium 420 may be volatile and/or non-volatile memory, such as DRAM, EEPROM, MRAM, PCRAM, memristor, flash memory, and the like. In some implementations, the memory 306 described in connection with FIG. 3 may be an example of the computer-readable medium 420 described in connection with FIG. 4.

The computer-readable medium 420 may include code (e.g., data and/or instructions). For example, the computer-readable medium 420 may include point cloud data 421, conversion instructions 422, compensation prediction instructions 423, deformation prediction instructions 424, printing instructions 425, and/or comparison instructions 419.

In some examples, the computer-readable medium 420 may store point cloud data 421. Some examples of point cloud data 421 include samples of a 3D object model (e.g., 3D CAD file), point cloud(s), and/or scan data, etc. The point cloud data 421 may indicate the shape of a 3D object (e.g., an actual 3D object or a 3D object model).

In some examples, the conversion instructions 422 are code to cause a processor to convert an object model point cloud into a graph based on determining neighbor points for each point of the object model point cloud. In some examples, this may be accomplished as described in relation to FIG. 3. For instance, the conversion instructions 422 may be executed to determine neighbor points and edges for each point of the object model point cloud. Determining the neighbor points may include determining a set of nearest neighbor points relative to a point of the object model point cloud. The object model point cloud may correspond to a 3D object model for 3D printing. In some examples, the conversion may be accomplished using a KNN approach.

In some examples, the compensation prediction instructions 423 are code to cause the processor to predict a compensated point cloud based on an object model point cloud. In some examples, this may be accomplished as described in relation to FIG. 1, FIG. 2, and/or FIG. 3. For instance, the compensation prediction instructions 423 may be executed to determine an edge feature for each edge of the graph and/or to convolve the edge features by the compensation machine learning model to predict the object compensation as a compensated point cloud.

In some examples, the printing instructions 425 are instructions to cause a processor to instruct a 3D printer to print a 3D object based on the compensated point cloud. In some examples, this may be accomplished as described in relation to FIG. 1, FIG. 2, and/or FIG. 3.

In some examples, the deformation prediction instructions 424 are code to cause the processor to predict a deformed point cloud based on the compensated point cloud. In some examples, this may be accomplished as described in relation to FIG. 1, FIG. 2, and/or FIG. 3. For instance, the deformation prediction instructions 424 may be executed to determine an edge feature for each edge of the graph and/or to convolve the edge features by the deformation machine learning model to predict the deformed point cloud.

In some examples, the comparison instructions 419 are code to cause the processor to compare a scanned object point cloud from the 3D object with the deformed point cloud and with the object model point cloud. In some examples, this may be accomplished as described in relation to FIG. 1, FIG. 2, and/or FIG. 3.

Figure 5:
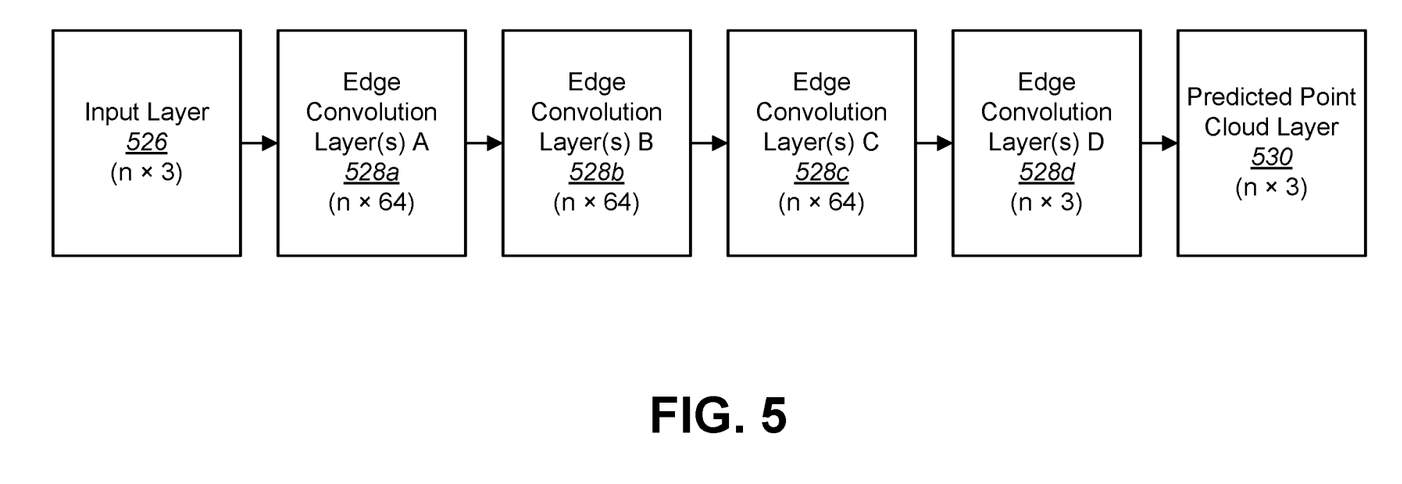
FIG. 5 is a block diagram illustrating an example of a machine learning model architecture.

FIG. 5 is a block diagram illustrating an example of a machine learning model architecture. The machine learning model architecture may be an example of the machine learning models described herein. For example, the machine learning model architecture may be utilized for the compensation machine learning model and/or for the deformation machine learning model. The machine learning model architecture includes nodes and layers. For example, the machine learning model architecture includes an input layer 526, edge convolution layer(s) A 528a, edge convolution layer(s) B 528b, edge convolution layer(s) C 528c, edge convolution layer(s) D 528d, and a predicted point cloud layer 530. In some examples, the machine learning model architecture may utilize an L2 norm loss function and/or an adaptive moment estimation (Adam) optimizer. For some examples of the compensation machine learning model, the input layer 526 may take an object model point cloud, and the predicted point cloud layer 530 may provide a compensated point cloud. For some examples of the deformation machine learning model, the input layer 526 may take a compensated point cloud, and the predicted point cloud layer 530 may provide a deformed point cloud.

In the example of FIG. 5, the machine learning model architecture stacks several edge convolution layers 528a-d. While FIG. 5 illustrates one example of a machine learning architecture that may be utilized in accordance with some of the techniques described herein, the architecture is flexible and/or other architectures may be utilized. The input layer 526 may have dimensions of n×3, where n represents n points of the point cloud (e.g., object model point cloud or compensated point cloud, etc.) and 3 represents x, y, and z coordinates. In another example, the machine learning model architecture may have more features as input (e.g., the geometric normal of the x, y, and z coordinates, where the input layer would have dimensions of n×6). In the example of FIG. 5, edge convolution layer(s) A 528a, edge convolution layer(s) B 528b, and edge convolution layer(s) C 528c each have dimensions of n×64. Edge convolution layer(s) D 528d has dimensions of n×3. The predicted point cloud layer 530 has dimensions of n×3. In some examples, more or fewer edge convolution blocks may be utilized, which may include more or fewer edge convolution layers in each block. Besides edge convolution blocks, other layers (e.g., pooling layers) may or may not be added.

Figure 6A:
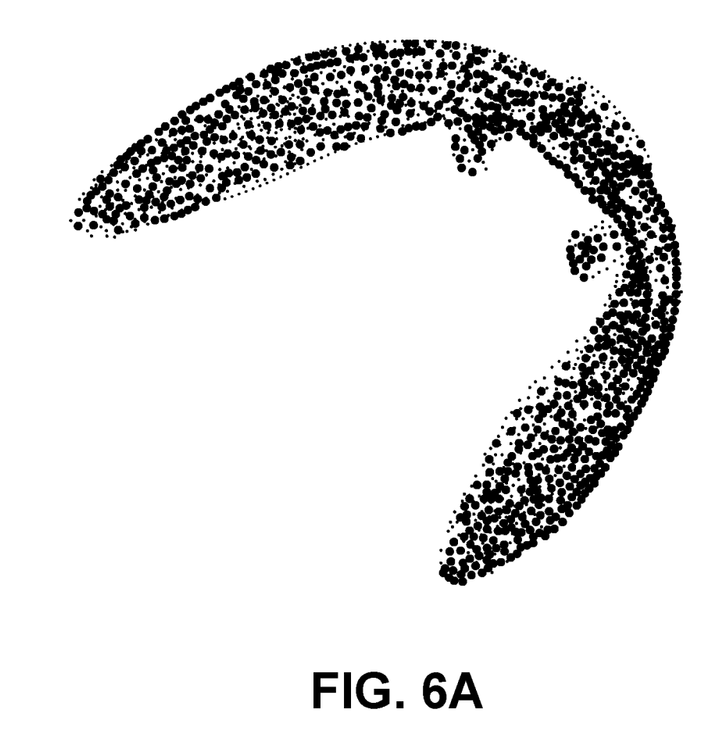
FIG. 6A is a diagram illustrating an example of an object model point cloud.

FIG. 6A is a diagram illustrating an example of an object model point cloud. For instance, a point cloud of a 3D object model may be utilized as an object model point cloud in accordance with some of the techniques described herein. In some examples of 3D printing, the 3D object model (e.g., CAD design) may provide data and/or instructions for the object(s) to print. In some examples, an apparatus may slice layers from the 3D object model. The layers may provide the data and/or instructions for actual printing. To enable printing with improved accuracy, the 3D object model may be controlled. The object model point cloud(s) may provide the representation of the 3D object model. To measure and represent the shape (e.g., geometry) of manufactured objects, a 3D scanner may be utilized to measure the geometry of the actual printed objects. The measured shape may be represented as point clouds. The scanned points may be aligned with the points corresponding to the 3D object model, which may enable calculating the deformation. For example, with two datasets: (1) scanned object point clouds and (2) object model point clouds, a machine learning model or models may be developed to provide accurate compensation prediction (e.g., a compensated model, compensated point cloud, etc.) for printing. The number and/or density of the point clouds utilized may be tunable (e.g., experimentally tunable).

Figure 6B:
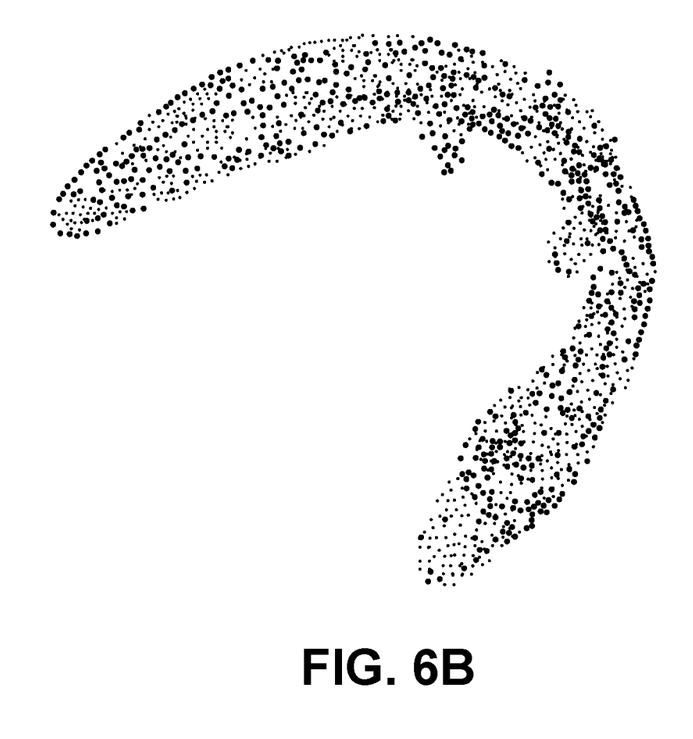
FIG. 6B is a diagram illustrating an example of a scanned object point cloud.

FIG. 6B is a diagram illustrating an example of a scanned object point cloud. For instance, the scanned object point cloud of FIG. 6B may be a representation of an object scan.

Figure 7:
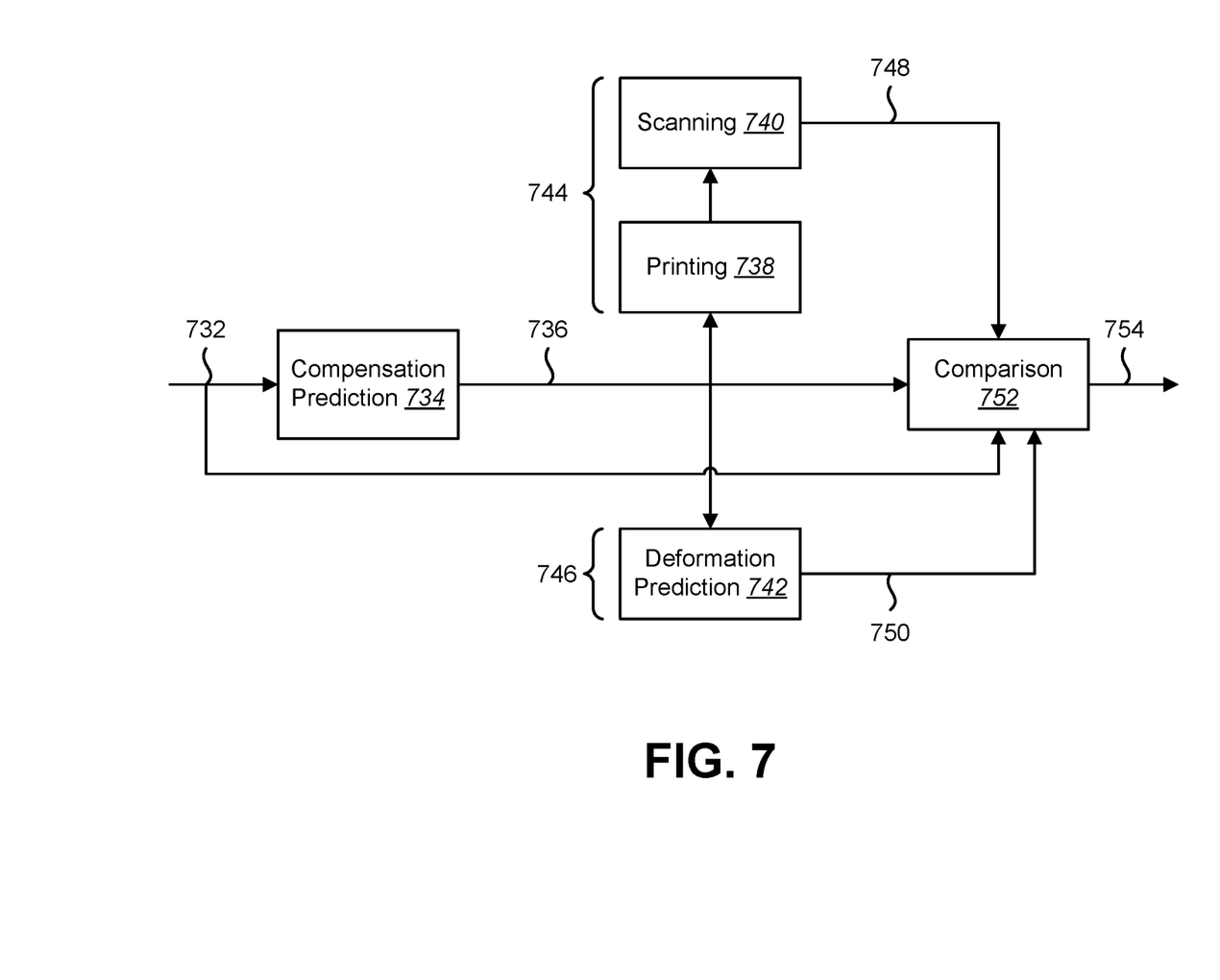
FIG. 7 is a block diagram illustrating an example of components that may be utilized in accordance with some examples of the techniques described herein.

FIG. 7 is a block diagram illustrating an example of components that may be utilized in accordance with some examples of the techniques described herein. In some examples, a component or components described in relation to FIG. 7 may be implemented in the apparatus 302 described in relation to FIG. 3. In some examples, a function or functions described in relation to any of FIGS. 1-6 may be implemented in a component or components described in relation to FIG. 7. A component or components described in relation to FIG. 7 may be implemented in a device or devices, in hardware (e.g., circuitry) and/or in a combination of hardware and instructions or code (e.g., processor and instructions). The components described in relation to FIG. 7 include a compensation prediction 734 component, a printing 738 component, a scanning 740 component, a deformation prediction 742 component, and a comparison 752 component.

The compensation prediction 734 component may include and/or implement a compensation machine learning model. The compensation machine learning model may be trained to learn a relationship from the resulting geometry (e.g., a manufactured object) to a 3D object model (e.g., original CAD design). In the training phase, scanned point clouds may be utilized as input, to predict object point clouds, where the object point clouds are utilized as ground truth. Once the compensation model is trained, in the prediction or inferencing phase, a 3D object model 732 (e.g., object model point cloud) with target geometry may be utilized as input to predict a compensated model 736 (e.g., compensated CAD model, compensated point cloud, etc.). For example, the compensation prediction 734 may utilize a 3D object model 732 to generate a compensated model that may be utilized to reduce error after printing 738.

For example, the compensated model 736 (e.g., compensated point cloud) may be utilized for printing 738. Printing 738 may produce an object, which may be utilized for scanning 740. Scanning 740 may produce a scanned model 748 (e.g., scanned object point cloud) of the object. In some examples, printing 738 and/or scanning 740 may be performed in an online stage 744. In an online stage 744, for example, the compensated model 736 may be utilized as an input to printing 738 to print the object. Scanning 740 (e.g., a 3D scanner) may scan the surface geometry of the printed object to produce a scanned model 748 (e.g., scanned object point cloud). It may be beneficial for the scanned model 748 geometry to approach the 3D object model 732 geometry.

The compensated model 736 may be utilized by deformation prediction 742 to produce a deformed model 750. In some examples, deformation prediction 742 may be performed in an offline stage 746. In the offline stage, for example, the compensated model 736 may be utilized as input to the deformation prediction 742 to predict a deformed model 750. It may be beneficial for the deformed model 750 geometry to approach the 3D object model 732 geometry.

In some examples, the 3D object model 732, the compensated model 736, the scanned model 748, and/or the deformed model 750 may be provided to a comparison 752 component. The comparison 752 may produce comparison information 754, which may indicate a comparison or comparisons of the 3D object model 732, the compensated model 736, the scanned model 748, and/or the deformed model 750. For example, the comparison 752 component may demonstrate the accuracies and/or inaccuracies of the compensation prediction 734 and/or the deformation prediction 742. For example, the scanned model 748 from the online stage 744 and the deformed model 750 may be compared to indicate the performance of the compensation prediction 734 and/or the deformation prediction 742. The comparison information 754 may be utilized to improve the compensation prediction 734 and/or the deformation prediction 742 to improve printing accuracy performance.

Figure 8A:
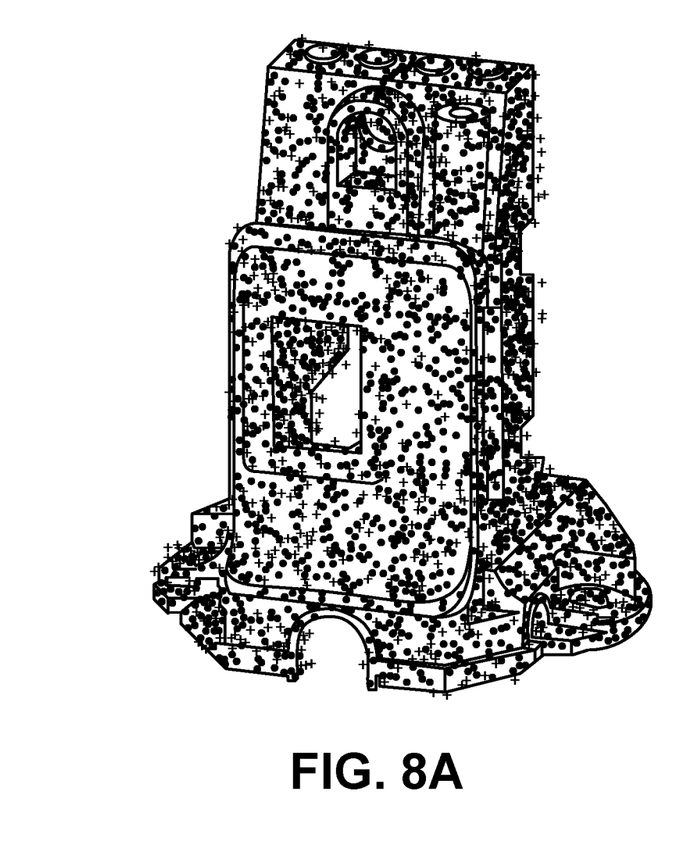
FIG. 8A is a diagram illustrating an example of model prediction and comparison.

FIG. 8A is a diagram illustrating an example of model prediction and comparison. For example, FIG. 8A illustrates a scanned object model as a line drawing, with an object model point cloud illustrated as dots and a predicted compensated point cloud as crosses. In this example, a compensation machine learning model was trained with 99 objects, with 80 objects for training, 10 objects for validation, and 9 objects for testing. 10,000 sample points were scanned for each object. In some examples of the techniques described herein, the number of sample points may be flexible and may be tuned experimentally. In this example, mean-squared error between the scanned points and prediction geometry was (in units of millimeters (mm)) 0.30 for an x dimension, 0.42 for a y dimension, and 0.35 for a z dimension.

Figure 8B:
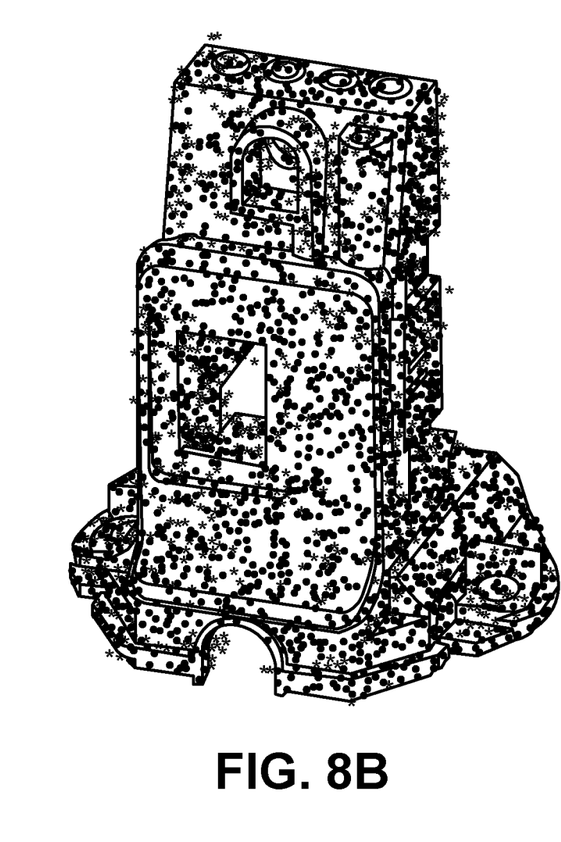
FIG. 8B is a diagram illustrating an example of model prediction and comparison.

FIG. 8B is a diagram illustrating an example of model prediction and comparison. For example, FIG. 8B illustrates a scanned object model as a line drawing, with an object model point cloud illustrated as dots and a predicted deformed point cloud in an offline stage as stars. In this example, mean-squared error between the 3D object model (e.g., object model point cloud) and the predicted geometry was (in units of millimeters (mm)) 0.55 for an x dimension, 0.68 for a y dimension, and 0.80 for a z dimension. The values are larger due to accumulated error in connecting the compensation machine learning object model and the deformation machine learning object model.

Some examples of the techniques described herein may utilize a DGCNN and/or may adopt a KNN approach to accomplish edge convolution. Edge convolution may transfer feature extraction in an unstructured point cloud into regular convolution, which may enable local feature learning (e.g., for simulating detailed thermal diffusive effects). In some examples, global features (that simulate the overall thermal mass, for instance) may be implemented via incorporating the entire list of global coordinates of point clouds. Some examples of the techniques described herein may be beneficial by providing a data-driven end-to-end approach for geometry compensation prediction and/or deformation prediction. Some examples of the techniques described herein may be beneficial by providing a deep learning approach that can learn local geometrical structures from unstructured point clouds, and can learn both local and global features in accordance with physical insight (e.g., thermal fusion-driven deformation). Some of the techniques described herein may provide a framework for both online and offline shape deformation control.

Some examples of the techniques disclosed herein may be beneficial by providing a quantitative model(s) to predict surface geometry of a manufactured (e.g., printed) object and/or compensation ubiquitously (e.g., over an entire 3D object model) with improved speed and/or accuracy. Some examples may be beneficial by providing deep learning end-to-end models that may learn local and global features from point clouds, which may represent thermal fusion-driven deformation.

As used herein, the term "and/or" may mean an item or items. For example, the phrase "A, B, and/or C" may mean any of: A (without B and C), B (without A and C), C (without A and B), A and B (but not C), B and C (but not A), A and C (but not B), or all of A, B, and C.

While various examples of systems and methods are described herein, the systems and methods are not limited to the examples. Variations of the examples described herein may be implemented within the scope of the disclosure. For example, operations, functions, aspects, or elements of the examples described herein may be omitted or combined.

The invention claimed is:

1. A method, comprising:
predicting a compensated model based on a three-dimensional (3D) object model having global values and local values for each of a plurality of edges, wherein the compensated model comprises of a training object model point cloud representing the 3D object model with modifications that compensate for a predicted manufacturing deformation, wherein the global values provide global information for simulating a thermal mass effect feature of the plurality of edges, and wherein the local values provide local neighborhood information for simulating a thermal diffusion effect feature of the plurality of edges;
predicting a deformed model based on convolution of features of the plurality of edges for the compensated model predicted;
comparing the deformed model to the 3D object model; and
based on comparing the deformed model to the 3D object model, adjusting one or more of the 3D object model, the compensation machine learning model, the compensated model, or a printing variable to reduce geometric inaccuracy in a 3D object to be printed.

2. The method of claim 1, wherein the compensated model is predicted further based on an object model point cloud of the 3D object model.

3. The method of claim 1, wherein predicting the compensated model is further based on a compensation machine learning model.

4. The method of claim 3, wherein the compensation machine learning model is trained with a training scanned object point cloud as input and a training object model point cloud as output.

5. The method of claim 1, wherein predicting the deformed model is further based on a deformation machine learning model.

6. The method of claim 5, wherein the deformation machine learning model is trained with a training object model point cloud as input and a training scanned object point cloud as output.

7. The method of claim 1, further comprising comparing the deformed model predicted from the compensated model with the 3D object model.

8. The method of claim 1, further comprising:
printing a 3D object based on the compensated model; and
comparing a scanned object point cloud of the 3D object with an object model point cloud of the 3D object model and with a deformed point cloud of the deformed model.

9. The method of claim 8, wherein printing the 3D object is performed in an online stage and predicting the deformed model is performed in an offline stage.

10. The method of claim 8, further comprising presenting an image of the scanned object point cloud with the object model point cloud and the deformed point cloud.

11. An apparatus comprising:
a memory; and
a processor in electronic communication with the memory, wherein the processor is to:
based on a compensation machine learning model and a three-dimensional (3D) object model having global values and local values for each of a plurality of edges, predict a compensated model that comprises a training object model point cloud representing the 3D object model with modifications that compensate for a predicted manufacturing deformation, wherein the global values provide global information for simulating a thermal mass effect feature of the plurality of edges, and wherein the local values provide local neighborhood information for simulating a thermal diffusion effect feature of the plurality of edges;

predict a deformed model that comprises a deformed object model point cloud based on convolution of features of the plurality of edges for the compensated model that is predicted;

compare the deformed object model point cloud to a 3D object point cloud of the 3D object model; and based on comparing the deformed object model point cloud to the 3D object point cloud of the 3D object model, adjust one or more of the 3D object model, the compensation machine learning model, the compensated model, or a printing variable to reduce geometric inaccuracy in a 3D object to be printed.

12. The apparatus of claim 11, wherein the processor is to:

generate a graph by determining the plurality of edges for each point of the object model point cloud; and determine an edge feature for each of the plurality of edges of the graph, wherein the compensated point cloud prediction is based on the edge features.

13. The apparatus of claim 12, wherein the processor is to compare the deformed point cloud with the object model point cloud.

14. A non-transitory tangible computer-readable medium storing executable code, comprising:

code to cause a processor to:

based on a compensation machine learning model and a three-dimensional (3D) object model having global values and local values for each of a plurality of edges, predict a compensated model that comprises a training object model point cloud representing the 3D object model with modifications that compensate for a predicted manufacturing deformation, wherein the global values provide global information for simulating a thermal mass effect feature of the plurality of edges, and wherein the local values provide local neighborhood information for simulating a thermal diffusion effect feature of the plurality of edges;

predict a deformed model based on convolution of features of the plurality of edges for the compensated model predicted;

compare the deformed model to the 3D object model; and based on comparing the deformed model to the 3D object model, adjust one or more of the 3D object model, the compensation machine learning model, the compensated model, or a printing variable to reduce geometric inaccuracy in a 3D object to be printed.

15. The computer-readable medium of claim 14, further comprising code to cause the processor to compare a scanned object point cloud from the 3D object with the deformed point cloud and with the object model point cloud.

* * * * *